(12) United States Patent
Ramakrishnan et al.

(10) Patent No.: US 10,501,196 B2
(45) Date of Patent: Dec. 10, 2019

(54) NACELLE FOR AN AIRCRAFT AFT FAN

(71) Applicant: General Electric Company, Schenectady, NY (US)

(72) Inventors: Kishore Ramakrishnan, Rexford, NY (US); Patrick Michael Marrinan, Mason, OH (US)

(73) Assignee: General Electric Company, Schenectady, NY (US)

( * ) Notice: Subject to any disclaimer, the term of this patent is extended or adjusted under 35 U.S.C. 154(b) by 299 days.

(21) Appl. No.: 15/281,990

(22) Filed: Sep. 30, 2016

(65) Prior Publication Data

US 2018/0093776 A1    Apr. 5, 2018

(51) Int. Cl.
| | |
|---|---|
| *B64D 29/04* | (2006.01) |
| *B64D 27/18* | (2006.01) |
| *B64D 27/24* | (2006.01) |
| *B64D 27/08* | (2006.01) |
| *B64D 27/14* | (2006.01) |
| *B64D 27/20* | (2006.01) |
| B64D 27/02 | (2006.01) |

(52) U.S. Cl.
CPC .............. *B64D 29/04* (2013.01); *B64D 27/08* (2013.01); *B64D 27/14* (2013.01); *B64D 27/18* (2013.01); *B64D 27/20* (2013.01); *B64D 27/24* (2013.01); *B64D 2027/026* (2013.01)

(58) Field of Classification Search
CPC ......... B64D 29/00; B64D 29/02; B64D 29/04
See application file for complete search history.

(56) References Cited

U.S. PATENT DOCUMENTS

| | | | |
|---|---|---|---|
| 5,058,617 A | 10/1991 | Stockman et al. | |
| 7,685,805 B2 | 3/2010 | Alecu | |
| 8,205,430 B2 | 6/2012 | Jain | |
| 8,402,739 B2 | 3/2013 | Jain et al. | |
| 8,408,491 B2 | 4/2013 | Jain et al. | |
| 2008/0308684 A1 | 12/2008 | Chaudhry | |
| 2008/0310956 A1 | 12/2008 | Jain | |
| 2016/0332741 A1* | 11/2016 | Moxon | ................... B64C 15/00 |

OTHER PUBLICATIONS

Tomita et al., "Nacelle Design for Mixed Turbofan Engines", Aircraft Engine, vol. 2, pp. 10, pp. 201-210, May 8-11, 2006.
Chen et al., "Nacelle: Air Intake Aerodynamic Design and Inlet Compatibility", Compressors, pp. 8, Dec. 15-17, 2014.

* cited by examiner

*Primary Examiner* — Richard G Davis
(74) *Attorney, Agent, or Firm* — Dority & Manning, P.A.

(57) ABSTRACT

An aircraft includes a fuselage extending between a forward end and an aft end. An aft engine is mounted to the aft end of the fuselage, the aft engine defining a centerline. The aft engine further includes a nacelle having a bottom section, the bottom section having a forward lip. The forward lip of the bottom section defines a camber line. The camber line, in turn, defines an angle relative to the centerline of the aft engine greater than or equal to at least about five degrees.

22 Claims, 7 Drawing Sheets

NACELLE FOR AN AIRCRAFT AFT FAN

FIELD OF THE INVENTION

The present subject matter relates generally to an aft engine for an aircraft propulsion system, and more particularly to a nacelle for the aft engine.

BACKGROUND OF THE INVENTION

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

However, a drag on the aircraft, including the turbofan jet engines, also has an effect on the net propulsive thrust of the aircraft. A total amount of drag on the aircraft, including skin friction and form drag, is generally proportional to a difference between a freestream velocity of air approaching the aircraft and an average velocity of a wake downstream from the aircraft that is produced due to the drag on the aircraft.

Positioning a fan at an aft end of the fuselage of the aircraft may assist with improving propulsion efficiency by reenergizing a boundary layer airflow over the aft end of the fuselage. Accordingly, an aft fan configured to increase the amount of relatively low momentum boundary layer air ingested would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an aircraft defining a longitudinal direction is provided. The aircraft includes a fuselage extending between a forward end and an aft end along the longitudinal direction of the aircraft. The aircraft also includes an aft engine mounted to the aft end of the fuselage and defining a centerline. The aft engine further includes a nacelle including a bottom section having a forward lip, the forward lip defining a camber line and the camber line defining an angle relative to the centerline of the aft engine greater than or equal to at least about five degrees.

In another exemplary embodiment of the present disclosure, a propulsion system is provided for an aircraft. The aircraft includes a fuselage defining an aft end. The propulsion system includes an aft engine configured to be mounted to the aft end of the fuselage and defining a centerline. The aft engine further includes a nacelle including a bottom section having a forward lip. The forward lip defines a camber line and the camber line defines an angle relative to the centerline of the aft engine greater than or equal to at least about ten degrees.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "forward" and "aft" refer to the relative positions of a component based on an actual or anticipated direction of travel. For example, "forward" may refer to a front of an aircraft based on an anticipated direction of travel of the aircraft, and "aft" may refer to a back of the aircraft based on an anticipated direction of travel of the aircraft. Additionally, the terms "upstream" and "downstream" refer to the relative direction with respect to fluid flow in a fluid pathway. For example, "upstream" refers to the direction from which the fluid flows, and "downstream" refers to the direction to which the fluid flows.

Generally, the present disclosure is directed to a propulsion system and an aircraft including the same. The propulsion system generally includes an aft engine mounted to an aft end of a fuselage of the aircraft. The aft engine may ingest and re-energize a flow of boundary layer air over the fuselage of the aircraft. The aft engine defines a centerline and further includes a nacelle. The nacelle includes a bottom section having a forward lip, the forward lip defining a camber line. For certain exemplary embodiments, the propulsion system is configured with an aircraft having a geometry such that the boundary layer airflow over a bottom side of the fuselage has a relatively low momentum as compared to the boundary layer airflow over a top side of the fuselage. Accordingly, in order to increase an amount of relatively low momentum airflow ingested by the aft engine (and thus to increase an efficiency of the aft engine), the forward lip is configured such that the camber line of the forward lip defines an angle relative to the centerline of the aft engine greater than or equal to at least about ten degrees.

Figure 1:
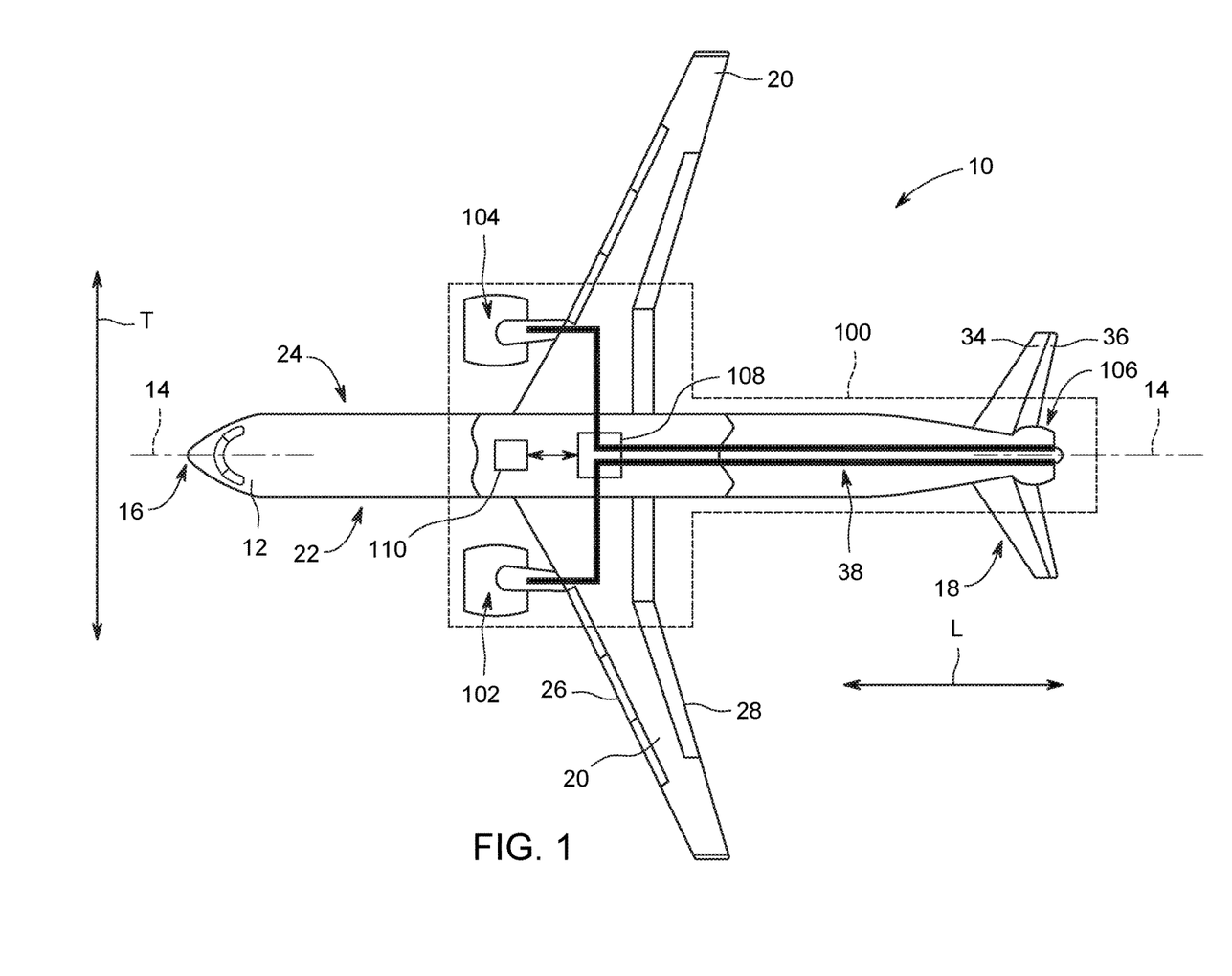
FIG. 1 is a top view of an aircraft according to various exemplary embodiments of the present disclosure.
Figure 2:
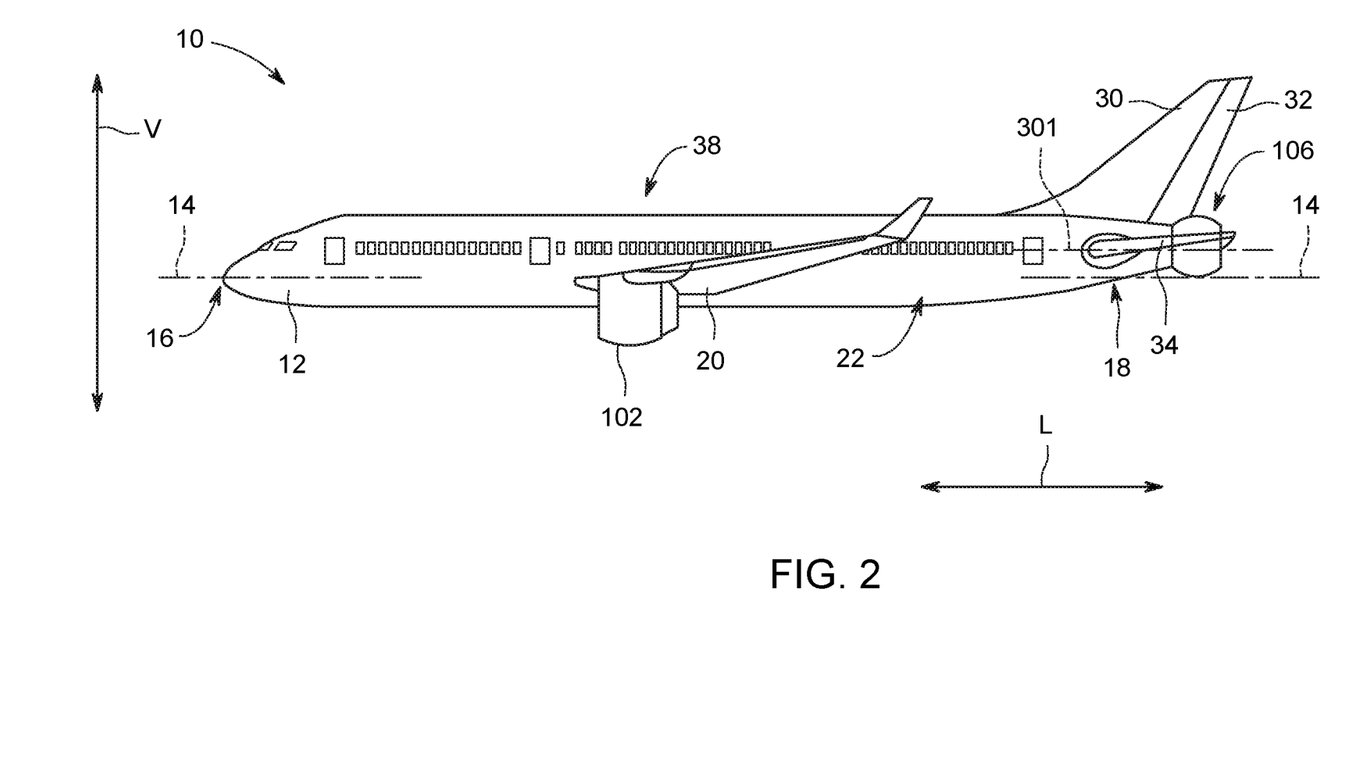
FIG. 2 is a port side view of the exemplary aircraft of FIG. 1

Referring now to the drawings, wherein identical numerals indicate the same elements throughout the figures, FIG. 1 illustrates a top view of one embodiment of the aircraft 10 according to the present disclosure. FIG. 2 illustrates a port side view of the aircraft 10 as illustrated in FIG. 1. As shown in FIGS. 1 and 2 collectively, the aircraft 10 defines a longitudinal centerline 14 that extends therethrough, a vertical direction V, a transverse direction T, and a longitudinal direction L.

Moreover, the aircraft 10 includes a fuselage 12, extending longitudinally between a forward end 16 and an aft end 18, and a pair of wings 20. As used herein, the term "fuselage" generally includes all of the body of the aircraft 10, such as an empennage of the aircraft 10 and an outer surface or skin 38 of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Further, as shown in the illustrated embodiment, each of the wings 20 depicted includes one or more leading edge flaps 26 and one or more trailing edge flaps 28. The aircraft 10 may also include a vertical stabilizer 30 having a rudder flap 32 for yaw control, and a pair of horizontal stabilizers 34, each having an elevator flap 36 for pitch control. It should be appreciated however, that in other exemplary embodiments of the present disclosure, the aircraft 10 may additionally or alternatively include any other suitable configuration of stabilizer that may or may not extend directly along the vertical direction V or horizontal/transverse direction T.

In addition, the aircraft 10 of FIGS. 1 and 2 includes a propulsion system 100, herein referred to as "system 100." The system 100 includes a pair of aircraft engines, at least one of which mounted to each of the pair of wings 20, and an aft engine. For example, as shown, the aircraft engines are configured as turbofan jet engines 102, 104 suspended beneath the wings 20 in an under-wing configuration. Additionally, the aft engine is configured as an engine that ingests and consumes air forming a boundary layer over the fuselage 12 of the aircraft 10. Specifically, the aft engine is configured as a fan, i.e., a Boundary Layer Ingestion (BLI) fan 106, configured to ingest and consume air forming a boundary layer over the fuselage 12 of the aircraft 10. Further, as shown in FIG. 2, the BLI fan 106 is mounted to the aircraft 10 at a location aft of the wings 20 and/or the jet engines 102, 104, such that a central axis 15 extends therethrough. As used herein, the "central axis" refers to a midpoint line extending along a length of the BLI fan 106. Further, for the illustrated embodiment, the BLI fan 106 is fixedly connected to the fuselage 12 at the aft end 18 of the fuselage 12, such that the BLI fan 106 is incorporated into or blended with a tail section at the aft end 18.

In various embodiments, the jet engines 102, 104 may be configured to provide power to an electric generator 108 and/or an energy storage device 110. For example, one or both of the jet engines 102, 104 may be configured to provide mechanical power from a rotating shaft (such as an LP shaft or HP shaft) to the electric generator 108. Additionally, the electric generator 108 may be configured to convert the mechanical power to electrical power and provide such electrical power to one or more energy storage devices 110 and/or the BLI fan 106. Accordingly, in such embodiments, the propulsion system 100 may be referred to as a gas-electric propulsion system. It should be appreciated, however, that the aircraft 10 and propulsion system 100 depicted in FIGS. 1 and 2 is provided by way of example only and that in other exemplary embodiments of the present disclosure, any other suitable aircraft 10 may be provided having a propulsion system 100 configured in any other suitable manner.

Figure 3:
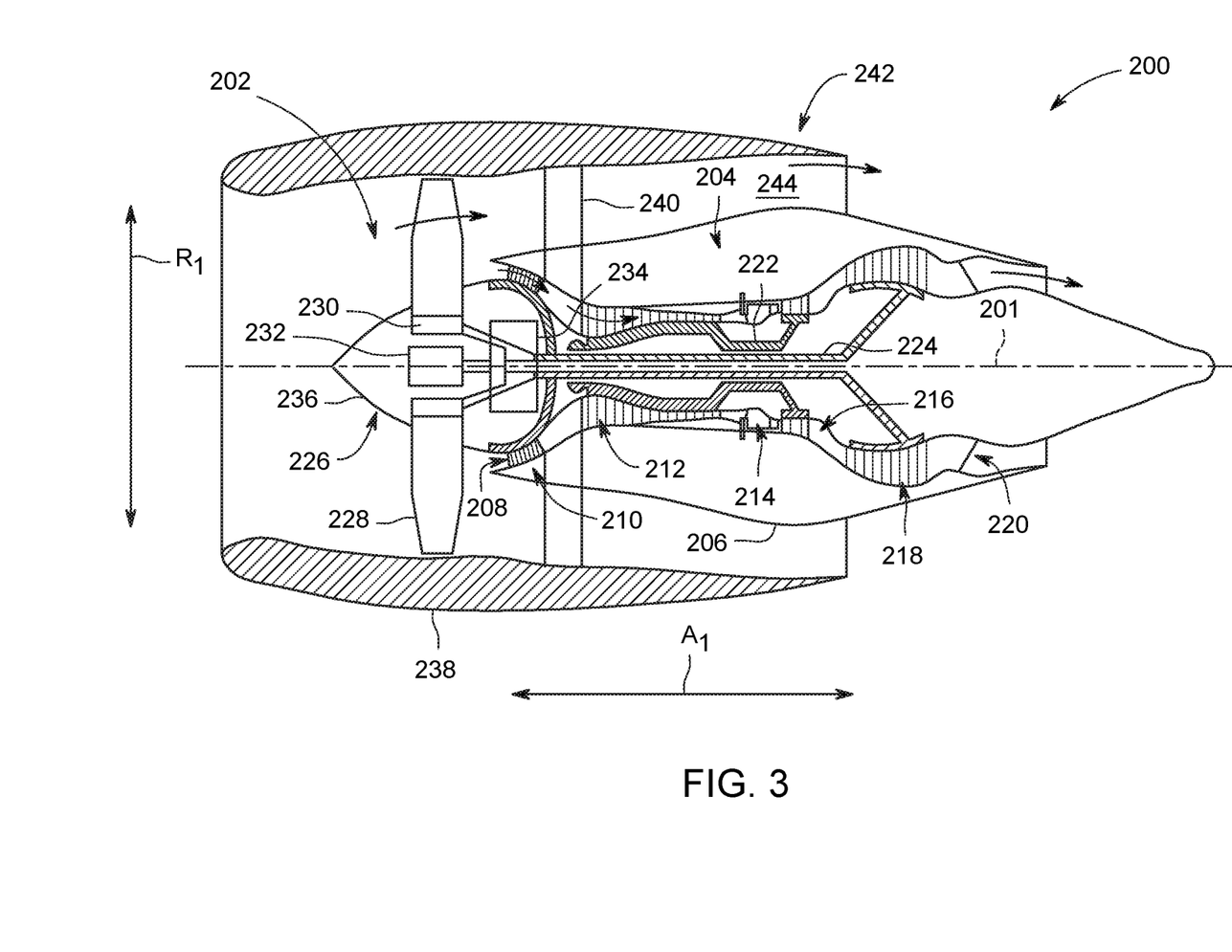
FIG. 3 is a schematic, cross-sectional view of a gas turbine engine in accordance with an exemplary embodiment of the present disclosure.

Referring now to FIG. 3, in certain embodiments, the jet engines 102, 104 may be configured as high-bypass turbofan jet engines. More specifically, FIG. 3 illustrates a schematic cross-sectional view of one embodiment of a high-bypass turbofan jet engine 200, herein referred to as "turbofan 200." In various embodiments, the turbofan 200 may be representative of jet engines 102, 104. Further, as shown, the turbofan 200 engine 10 defines an axial direction $A_1$ (extending parallel to a longitudinal centerline 201 provided for reference) and a radial direction $R_1$. In general, the turbofan 200 includes a fan section 202 and a core turbine engine 204 disposed downstream from the fan section 202.

In particular embodiments, the core turbine engine 204 generally includes a substantially tubular outer casing 206 that defines an annular inlet 208. It should be appreciated, that as used herein, terms of approximation, such as "approximately," "generally," "substantially," or "about," refer to being within a ten percent margin of error. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

Further, as shown, the fan section 202 includes a variable pitch fan 226 having a plurality of fan blades 228 coupled to a disk 230 in a spaced apart manner. As depicted, the fan blades 228 extend outwardly from the disk 230 generally along the radial direction $R_1$. Each fan blade 228 is rotatable relative to the disk 230 about a pitch axis by virtue of the fan blades 228 being operatively coupled to a suitable actuation member 232 configured to collectively vary the pitch of the fan blades 228, e.g., in unison. As such, the fan blades 228, the disk 230, and the actuation member 232 are together rotatable about the longitudinal axis 201 by LP shaft 224 across, for the embodiment depicted, a power gearbox 234. In certain embodiments, the power gearbox 234 includes a plurality of gears for stepping down the rotational speed of the LP shaft 224 to a more efficient rotational fan speed.

Referring still to FIG. 3, the disk 230 is covered by rotatable front hub 236 aerodynamically contoured to promote an airflow through the plurality of fan blades 228. Additionally, the fan section 202 includes an annular fan casing or outer nacelle 238 that circumferentially surrounds the fan 226 and/or at least a portion of the core turbine engine 204. The outer nacelle 238 is supported relative to the core turbine engine 204 by a plurality of circumferentially-spaced outlet guide vanes 240. Moreover, a downstream section 242 of the nacelle 238 extends over an outer portion of the core turbine engine 204 so as to define a bypass airflow passage 244 therebetween.

It should be appreciated, however, that the turbofan engine 200 depicted in FIG. 3 is by way of example only, and that in other exemplary embodiments, the turbofan engine 200 may have any other suitable configuration. Further, it should be appreciated, that in other exemplary embodiments, the jet engines 102, 104 may instead be configured as any other suitable aeronautical engine, such as a turbojet engine or turboprop engine.

Figure 4:
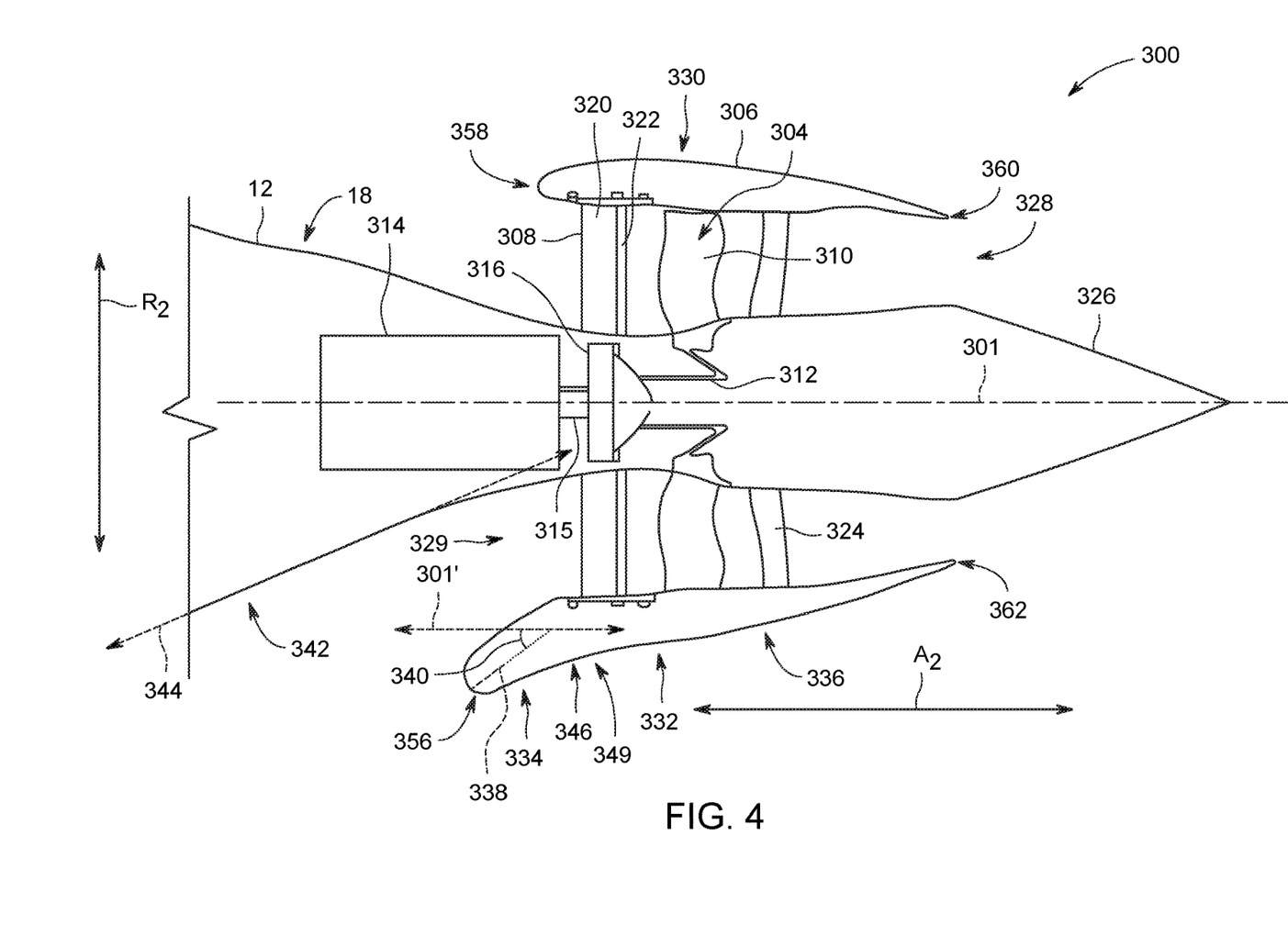
FIG. 4 is a schematic, cross-sectional view of an aft engine in accordance with an exemplary embodiment of the present disclosure.

Referring now to FIG. 4, a schematic, cross-sectional side view of an aft engine in accordance with various embodiments of the present disclosure is provided. More specifically, as shown, the aft engine is configured as a boundary layer ingestion (BLI) fan 300 mounted to an aft end 18 of a fuselage 12 of an aircraft 10. The BLI fan 300 may be configured in substantially the same manner as the BLI fan 106 described above with reference to FIGS. 1 and 2 and the aircraft 10 may be configured in substantially the same manner as the exemplary aircraft 10 described above with reference to FIGS. 1 and 2.

More specifically, as shown, the BLI fan 300 defines an axial direction $A_2$ extending along a centerline 301 of the BLI fan 300, which for the embodiment depicted is the same as the central axis 15. Additionally, the BLI fan 300 defines a radial direction $R_2$ and a circumferential direction $C_2$ (i.e., a direction extending about the axial direction $A_2$; see FIG. 6). In general, the BLI fan 300 includes a fan 304 rotatable about the centerline 301, a nacelle 306 extending around at least a portion of the fan 304, and one or more structural members extending between the nacelle 306 and the fuselage 12 of the aircraft 10. In certain embodiments, the one or more structural members may be configured as one or more inlet guide vanes 308 and/or as one or more outlet guide vanes 324. Notably, as used herein, the term "fuselage" includes an inner surface of the BLI fan 300 even though in certain embodiments, the inner surface of the BLI fan 300 may be formed with the BLI fan 300 and mounted to, e.g., a bulkhead (not shown) within the fuselage 12 of the aircraft 10 as a unit.

Further, the fan 304 includes a plurality of fan blades 310 spaced generally along the circumferential direction $C_2$. Moreover, where present, the inlet guide vanes 308 extend between the nacelle 306 and the fuselage 12 of the aircraft 10 at a location forward of the plurality of fan blades 310. More specifically, as shown, the inlet guide vanes 308 generally extend substantially along the radial direction $R_2$ of the BLI fan 300 between the nacelle 306 and the fuselage 12 of the aircraft 10 for mounting the BLI fan 300 to the fuselage 12 of the aircraft 10. In addition, the inlet guide vanes 308 may be spaced substantially evenly along the circumferential direction $C_2$ of the BLI fan 300, or in any other suitable manner.

Further, the inlet guide vanes 308 may be shaped and/or oriented to direct and/or condition a flow of air into the BLI fan 300 to, e.g., increase an efficiency of the BLI fan 300, or reduce a distortion of the air flowing into the BLI fan 300. In addition, it should be understood that the inlet guide vanes 308 may be configured as fixed inlet guide vanes extending between the nacelle 306 and the fuselage 12 of the aircraft 10. Alternatively, the inlet guide vanes 308 may be configured as variable inlet guide vanes. For example, as shown in FIG. 4, the inlet guide vanes 308 include a body 320 and a tail flap 322. The body 320 is fixed relative to the nacelle 306 of the BLI fan 300 and the flap 322 is configured to rotate about a substantially radial axis. By rotating the flap 322 between various positions, the inlet guide vanes 308 may be configured to vary a direction in which air flowing thereover is directed.

As is also depicted in FIG. 4, the fan 304 additionally includes a fan shaft 312 with the plurality of fan blades 310 attached thereto. Although not depicted, the fan shaft 312 may be rotatably supported by one or more bearings located forward of the plurality of fan blades 310 and, optionally, one or more bearings located aft of the plurality of fan blades 310. Such bearings may be any suitable combination of roller bearings, ball bearings, thrust bearings, etc.

In certain embodiments, the plurality of fan blades 310 may be attached in a fixed manner to the fan shaft 312, or alternatively, the plurality of fan blades 310 may be rotatably attached to the fan shaft 312. For example, the plurality of fan blades 310 may be attached to the fan shaft 312 such that a pitch of each of the plurality of fan blades 310 may be changed, e.g., in unison, by a pitch change mechanism (not shown). Changing the pitch of the plurality of fan blades 310 may increase an efficiency of the BLI fan 300 and/or may allow the BLI fan 300 to achieve a desired thrust profile. With such an embodiment, the BLI fan 300 may be referred to as a variable pitch BLI fan.

The fan shaft 312 is mechanically coupled to a power source 314 located at least partially within the fuselage 12 of the aircraft 10, forward of the plurality of fan blades 310. Further, for the embodiment depicted, the fan shaft 312 is mechanically coupled to the power source 314 through a gearbox 316. The gearbox 316 may be configured to modify a rotational speed of the power source 314, or rather of a shaft 315 of the power source 314, such that the fan 304 of the BLI fan 300 rotates at a desired rotational speed. The gearbox 316 may be a fixed ratio gearbox, or alternatively, the gearbox 316 may define a variable gear ratio. With such an embodiment, the gearbox 316 may be operably connected to, e.g., a controller of the aircraft 10 for changing its ratio in response to one or more flight conditions.

In certain embodiments, the BLI fan 300 may be configured with a gas-electric propulsion system, such as the gas-electric propulsion system 100 described above with reference to FIG. 1. In such an embodiment, the power source 314 may be an electric motor that receives power from one or both of an energy storage device or an electric generator—such as the energy storage device 110 or electric generator 108 of FIGS. 1 and 2, the electric generator 108 converting mechanical power received from one or more under-wing mounted aircraft engines to electric power. Accordingly, in certain embodiments, the BLI fan 300 may be an electric fan. However, in other embodiments, the power source 314 may instead be any other suitable power source. For example, the power source 314 may alternatively be configured as a gas engine, such as a gas turbine engine or internal combustion engine. Moreover, in certain exemplary embodiments, the power source 314 may be positioned at any other suitable location within, e.g., the fuselage 12 of the aircraft 10 or the BLI fan 300. For example, in certain embodiments, the power source 314 may be configured as a gas turbine engine positioned at least partially within the BLI fan 300.

Referring still to FIG. 4, the BLI fan 300 may also additionally include one or more outlet guide vanes 324 and a tail cone 326. As shown in the illustrated embodiment, the outlet guide vanes 324 extend between the nacelle 306 and the tail cone 326 for directing a flow of air through the BLI fan 300, and optionally for adding strength and rigidity to the BLI fan 300. Further, the outlet guide vanes 324 may be evenly spaced along the circumferential direction $C_2$ or may have any other suitable spacing. Additionally, the outlet guide vanes 324 may be fixed outlet guide vanes, or alternatively may be variable outlet guide vanes. Inclusion of the plurality of outlet guide vanes 324 extending between the nacelle 306 and the tail cone 326 may allow for an efficiency of the BLI fan 300 to be maximized.

Further, aft of the plurality of fan blades 310, and for the embodiment depicted, aft of the one or more outlet guide vanes 324, the BLI fan 300 additionally defines a nozzle 328 between the nacelle 306 and the tail cone 326. As such, the nozzle 328 may be configured to generate an amount of thrust from the air flowing therethrough. In addition, the tail cone 326 may be shaped to minimize an amount of drag on the BLI fan 300. However, in other embodiments, the tail cone 326 may have any other shape and may, e.g., end forward of an aft end of the nacelle 306 such that the tail cone 326 is enclosed by the nacelle 306 at an aft end. Additionally, in other embodiments, the BLI fan 300 may not be configured to generate any significant amount of thrust, and instead may be configured to ingest air from a boundary layer of air of the fuselage 12 of the aircraft 10 and add energy/speed up such air to improve an overall propulsive efficiency of the aircraft 10.

Figure 5:
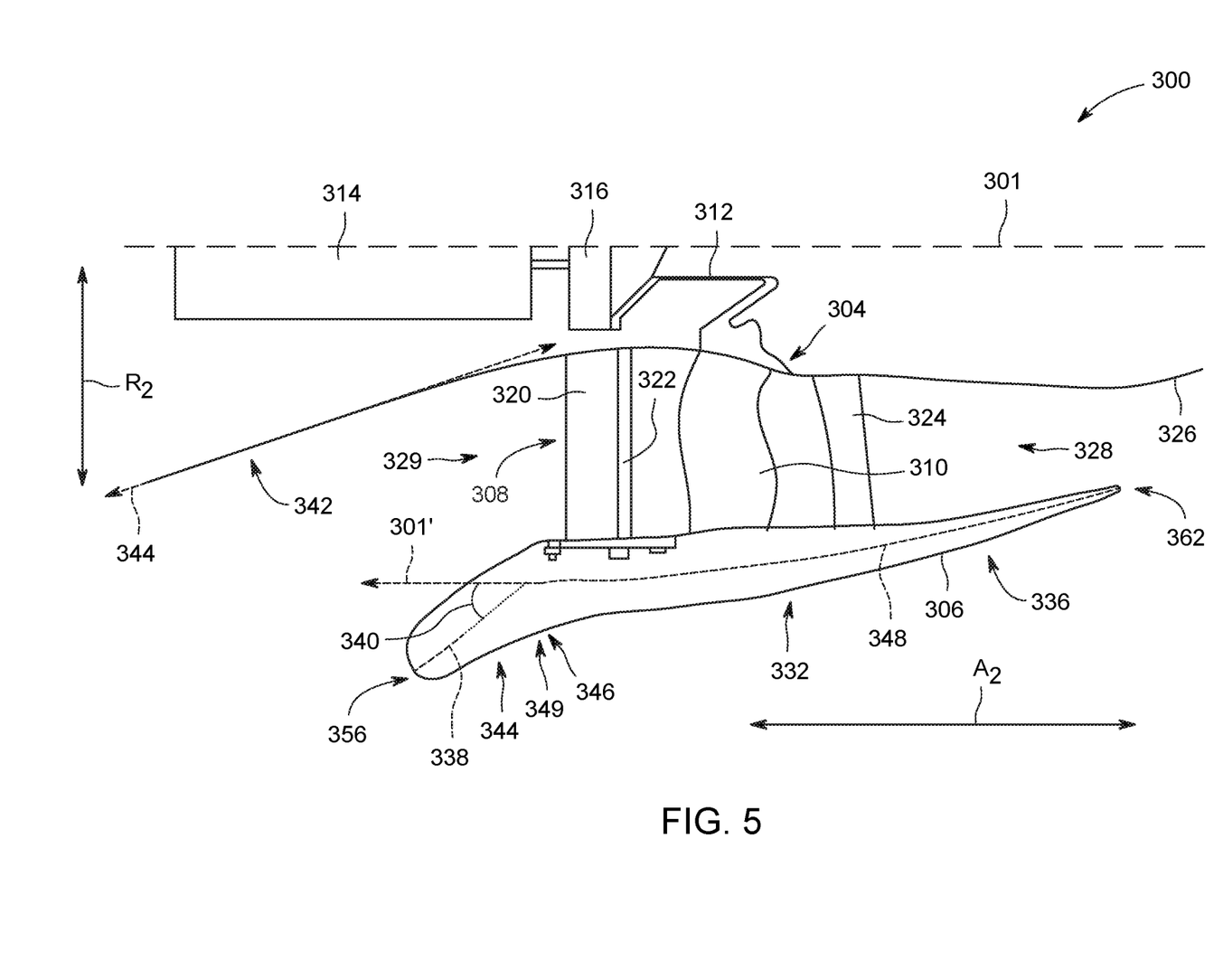
FIG. 5 is a close-up view of a forward lip of a nacelle of the exemplary aft engine of FIG. 4 in accordance with an exemplary embodiment of the present disclosure.

Referring still to FIG. 4, and now also to FIG. 5, providing a close-up view of a bottom section 332 of the nacelle 306, the nacelle 306 extends around and encircles the plurality of fan blades 310 and defines an inlet 329 at a forward end. The nacelle 306 additionally extends around the fuselage 12 of the aircraft 10 at an aft end 18 of the fuselage 12 when, as shown in FIG. 4, the BLI fan 300 is mounted to the aircraft 10. Notably, as used herein, the term "nacelle" includes the nacelle 306 as well as any structural fan casing or housing.

The nacelle 306 generally includes a top section 330 and a bottom section 332. As user herein, the bottom section 332 of the nacelle 306 generally refers to a portion of the nacelle 306 below a horizontal reference line 354 extending through the centerline 301 of the engine 300 (see FIG. 6). For example, the bottom section 332 may refer to a bottom one hundred and eighty degrees (180°) of the nacelle 306 (relative to the centerline 301, as viewed along the axial direction A2, with zero degrees (0°) being a top dead center position). In other embodiments, however, the bottom section 332 may instead refer to the bottom ninety degrees (90°), such as the bottom forty five degrees (45°), such as the bottom thirty degrees (30°), such as the bottom fifteen degrees (15°) (each relative to the centerline 301, as viewed along the axial direction A2, with zero degrees (0°) being a top dead center position). The bottom section 332 includes a forward lip 334 and a body portion 336 positioned aft of the forward lip 334. The forward lip 334 is, for the embodiment depicted, additionally positioned forward of the inlet guide vanes 308, however, in other embodiments, the BLI fan 300 may additionally or alternatively include one or more structural members extending between the forward lip 334 and the fuselage 12. Additionally, the forward lip 334 defines a camber line 338. The camber line 338 is, for the embodiment depicted, a best fit linear camber line. For example, the camber line 338 may be a best fit linear camber line determined using the least squares criterion. Further, the camber line 338 of the forward lip 334 for the embodiment depicted is the best fit linear camber line determined using the least squares criterion for a forward ten percent (10%) of the bottom portion 332 of the nacelle 306 (as measured against a total camber line length of the bottom portion 332 of the nacelle 306).

Moreover, the camber line 338 defines an angle 340 relative to the centerline 301 of the BLI fan 300 greater than or equal to at least about five degrees (5°), such that the forward lip 334 is oriented away from the centerline 301. Notably, FIG. 4 depicts a reference line 301' extending parallel to centerline 301 for clarity. For example, in certain embodiments, the camber line 338 of the forward lip 334 may define an angle 340 relative to the centerline 301 of the BLI fan 300 greater than or equal to at least about ten degrees (10°). As previously noted, the aircraft 10 with which the BLI fan 300 is configured with defines the vertical direction V (see FIG. 2). For the embodiment depicted, the forward lip 334 of the bottom section 332 of the nacelle 306 is oriented downwardly along the vertical direction V.

Additionally, the exemplary forward lip 334 of the bottom section 332 of the nacelle 306 is, for the embodiment depicted, complementary to a bottom side of the fuselage 12. More specifically, the bottom side of the fuselage 12 includes a slanted surface 342 extending generally along the longitudinal direction L towards the BLI fan 300 in a first direction 344. Notably, the slanted surface 342 of the bottom side of the fuselage 12 extends, for the embodiment depicted, beneath the forward lip 334 of the bottom section 332 of the nacelle 306. The camber line 338 of the forward lip 334 is within about twenty degrees (20°) of being parallel to the first direction 344. For example, in certain exemplary embodiments an angle between the camber line 338 and the first direction 344 may be between zero degrees and twenty degrees, such as between five degrees and fifteen degrees, such as between eight degrees and twelve degrees. As will be appreciated, such a configuration may assist with increasing an efficiency of the BLI fan 300 by increasing an amount of relatively low momentum air flowing over a bottom side of the fuselage 12 that is ingested by the BLI fan 300.

Moreover, the nacelle 306 is shaped to reduce an amount of resistance generated by an airflow over the nacelle 306. More specifically, the nacelle 306 includes an outer surface 346. The outer surface 346 defines a concave portion 349 having a concave shape between the forward lip 334 of the bottom section 332 and the body portion 336. The concave portion 349 of the outer surface 346 of the nacelle 306 may provide for a desired airflow over the outer surface 346 of the nacelle 306 to reduce an amount of resistance generated. It should be appreciated, however, that in other exemplary embodiments, the nacelle 306 may have any other suitable shape. For example, in other embodiments, the nacelle 306 may not include the concave portion 349.

Referring now particularly to FIG. 5, the forward lip 334 may be sized to capture a desired amount of relatively low momentum airflow over the bottom side of the fuselage 12 at the aft end 18 of the fuselage 12. More specifically, as is depicted, the body portion 336 of the bottom section 332 of the nacelle 306, extending from the forward lip 334 to an aft edge 362 of the bottom section 332 of the nacelle 306, also defines a camber line 348. The camber line 348 of the body portion 336 of the bottom section 332 defines a length LB (not labeled). Similarly, the camber line 338 of the forward lip 334 defines a length LL (not labeled). For the embodiment depicted, the length LL of the camber line 338 of the forward lip 334 of the bottom section 332 of the nacelle 306 is at least about five percent (5%) of the length LB of the camber line 348 of the body portion 336 of the bottom section 332 of the nacelle 306. For example, in certain embodiments, the length LL of the camber line 338 of the forward lip 334 is at least about ten percent (10%) of the length LB of the camber line 348 of the body portion 336. Such a configuration may allow for the nacelle 306 of the BLI fan 300 to direct additional relatively low momentum boundary layer air flowing over the bottom side of the fuselage 12 at the aft end of the fuselage 12 into the BLI fan 300.

Figure 6:
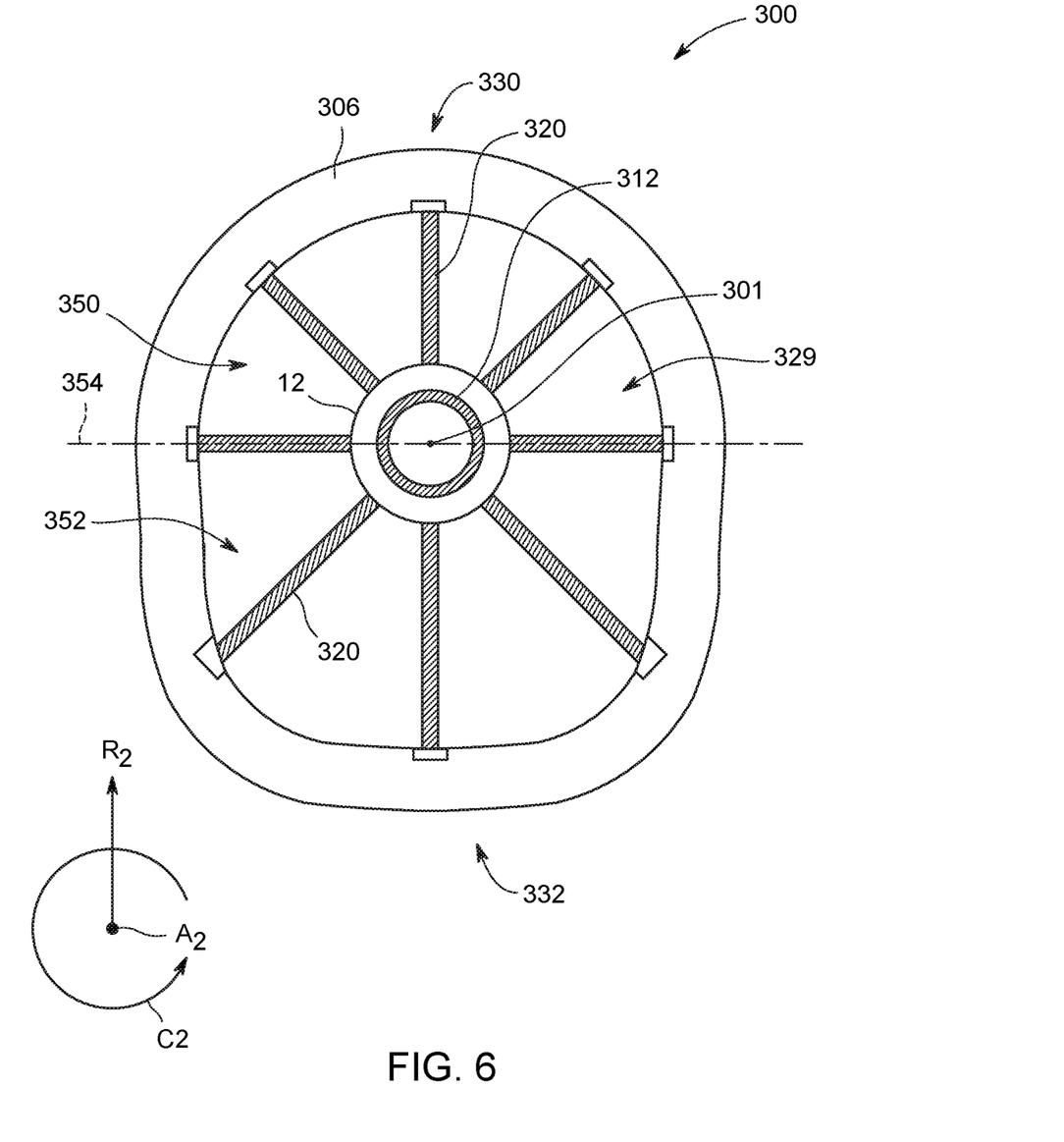
FIG. 6 is a forward-looking-aft view of the exemplary aft engine of FIG. 4.

Moreover, referring briefly now also to FIG. 6, providing a forward-looking-aft view of the inlet 329 to the BLI fan 300, the inlet 329 to the BLI fan 300 defines a non-axisymmetric shape. A momentum of the boundary layer air flowing into the BLI fan 300 may be less at a bottom side of the fuselage 12 as compared to the top side of the fuselage 12, especially given a greater slope of a surface of the fuselage 12 at the bottom side relative to the top side. Accordingly, the inlet 329 defined by the nacelle 306 with the fuselage 12 of the aircraft 10 may define a non-axis symmetric shape with respect to the centerline 301 of the BLI fan 300. For example, the inlet 329, which extends substantially three hundred and sixty degrees (360°) around the fuselage 12, includes a top half 350 positioned above the centerline 301 and a bottom half 352 positioned below the centerline 301. The top and bottom halves 350, 352 of the inlet 329 are depicted separated by a horizontal reference line 354 extending through the centerline 301. Moreover, the top half 350 of the inlet 329 defines a top half inlet area and the bottom half 352 of the inlet 329 defines a bottom half inlet area. The bottom half inlet area is greater than the top half inlet area, such that the inlet 329 may be configured to capture a desired amount of the boundary layer air flowing over the bottom side of the fuselage 12 with less momentum. For example, in certain embodiments, the bottom half inlet area may be at least about ten percent (10%) greater than the top half inlet area.

It should be appreciated, however, that the exemplary BLI fan 300 and nacelle 306 depicted in FIGS. 4 through 6 are provided by way of example only. In other exemplary embodiments, the exemplary BLI fan 300 and nacelle 306 may have any other suitable shape or configuration. For example, referring now to FIG. 7, a side, schematic, cross-sectional view of an aft engine in accordance with another exemplary embodiment of the present disclosure is depicted. The exemplary aft engine of FIG. 7 may be configured in substantially the same manner as the exemplary aft engine of FIG. 4. Accordingly, the same or similar numbers may refer to the same or similar part.

Figure 7:
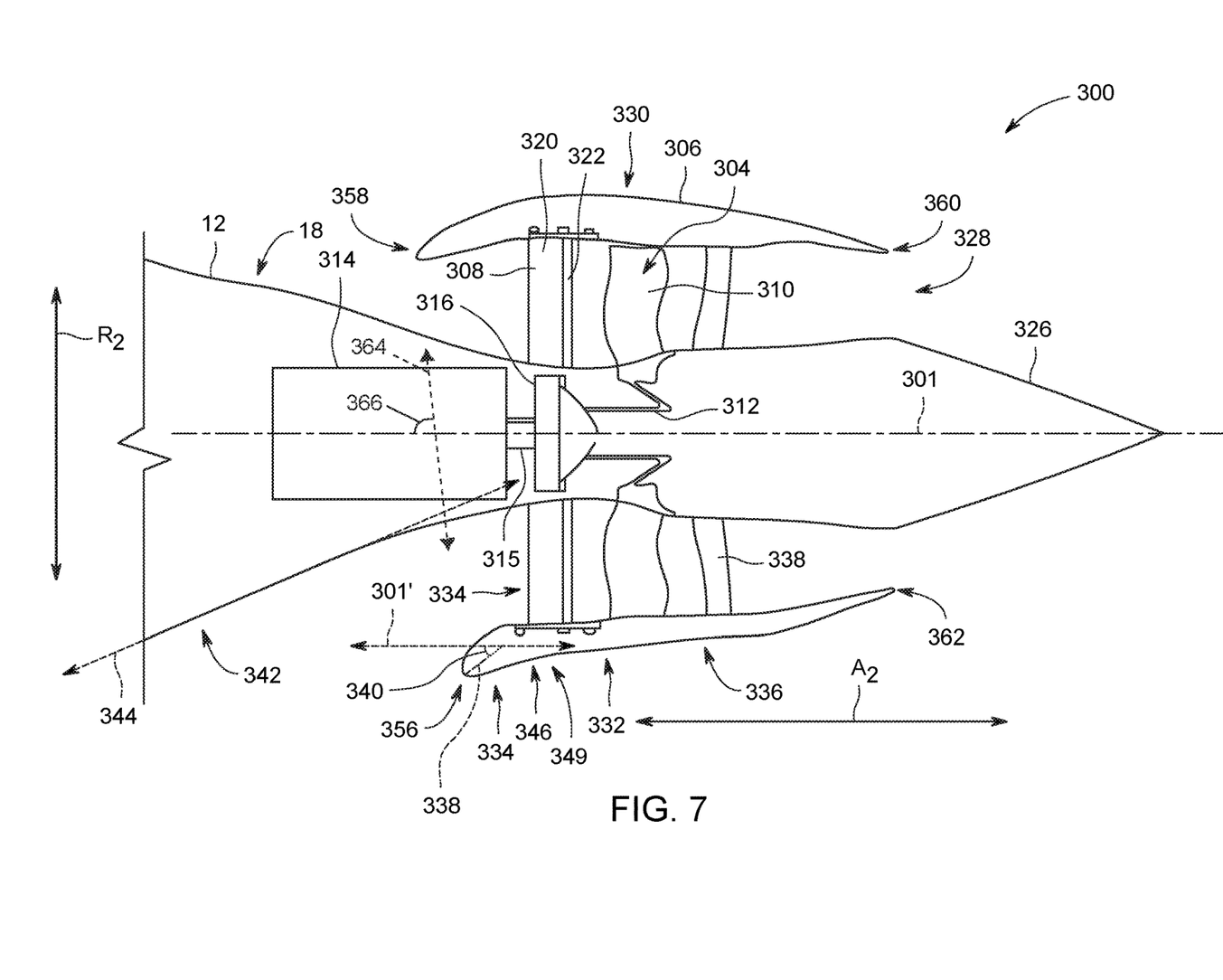
FIG. 7 is a schematic, cross-sectional view of an aft engine in accordance with another exemplary embodiment of the present disclosure.

For example, the aft engine of FIG. 7 is generally configured as a BLI fan 300 defining a centerline 301 and including a fan section 304 having a plurality of fan blades 310 rotatable by a power source 314, such as an electric motor, across a power gearbox 316. Additionally, the BLI fan 300 includes a nacelle 306 extending around the plurality of fan blades 310, and around the fuselage 12 of the aircraft 10.

However, for the exemplary embodiment depicted, a top section 330 of the nacelle 306 extends farther forward than a bottom section 332 of the nacelle 306. More specifically, the bottom section 332 of the nacelle 306 defines a forward edge 356, and similarly, the top section 330 of the nacelle 306 defines a forward edge 358. The forward edge 358 of the top section 330 is positioned farther forward than the forward edge 356 of the bottom section 332 along the longitudinal direction L and along the centerline 301 of the BLI fan 300. For example, the nacelle 306 may define a reference line 364 extending between the forward edge 358 of the top section 330 and the forward edge 356 of the bottom section 332. The reference line 364, for the embodiment depicted defines an angle 366 less than about eighty-five degrees (85°) with the centerline 301, such as less than about eighty degrees (80°), such as less than about seventy-five degrees (75°).

As is also depicted, the top and bottom sections 332, 330 of the nacelle 306 each define an aft edge 360, 362. The aft edges 360, 362 of the top and bottom sections 332, 330 of the nacelle 306 are positioned approximately at the same location along the centerline 301 of the BLI fan 300 along the longitudinal direction L. Accordingly, for the embodiment depicted, a top length (along the respective camber lines) between the forward edge 358 of the top section 330 of the nacelle 306 and the aft edge 360 of the top section 330 of the nacelle 306 is greater than a bottom length (along the respective camber lines) between the forward edge 356 of the bottom section 332 of the nacelle 306 and the aft edge 362 of the bottom section 332 of the nacelle 306. For example, in certain exemplary embodiments, the top length may be at least about five percent (5%) larger than the bottom length, such as at least about ten percent (10%) larger than the bottom length.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft defining a longitudinal direction and comprising:
    a fuselage extending between a forward end and an aft end along the longitudinal direction of the aircraft; and
    an aft engine mounted to the aft end of the fuselage and defining a centerline, the aft engine further comprising a nacelle including a bottom section having a forward lip, the forward lip defining a camber line and the camber line of the forward lip defining an angle relative to the centerline of the aft engine greater than or equal to at least about five degrees;
    wherein the nacelle of the aft engine further includes a body portion, wherein the nacelle of the aft engine defines an outer surface, wherein the outer surface of the nacelle includes a concave shape between the forward lip of bottom section and the body portion.

2. The aircraft of claim 1, wherein the camber line of the forward lip is a best fit linear camber line for a forward ten percent of the bottom section of the nacelle.

3. The aircraft of claim 1, wherein the camber line of the forward lip defines an angle relative to the centerline of the aft engine greater than or equal to at least about ten degrees.

4. The aircraft of claim 1, wherein the fuselage defines a bottom side having a slanted surface extending towards the aft engine, wherein the slanted surface of the bottom side of the fuselage extends in a first direction, and wherein the camber line of the forward lip is within about ten degrees of being parallel to the first direction.

5. The aircraft of claim 1, wherein the fuselage defines a bottom side having a slanted surface extending towards the aft engine, wherein the slanted surface of the bottom side of the fuselage extends in a first direction, and wherein the camber line of the forward lip defines an angle with the first direction between about five degrees and about fifteen degrees.

6. The aircraft of claim 1, wherein the nacelle further comprises a top section, wherein the bottom section of the nacelle defines a forward edge at the forward lip, wherein the top section of the nacelle defines a forward edge, wherein the forward edge of top section is positioned farther forward than a forward edge of the bottom section along the longitudinal direction and defines a reference line extending therebetween, and wherein the reference line defines an angle with the centerline of the aft engine less than about eighty-five degrees.

7. The aircraft of claim 1, further comprising:
a gas turbine engine; and
an electric generator driven by the gas turbine engine, wherein the aft engine is an electric fan powered by the electric generator.

8. The aircraft of claim 1, wherein the aft engine is a boundary layer ingestion fan.

9. The aircraft of claim 1, wherein the nacelle defines an inlet having a top half positioned above the centerline and a bottom half positioned below the centerline, wherein the top half of the inlet defines a top half inlet area, wherein the bottom half of the inlet defines a bottom half inlet area, and wherein the bottom half inlet area is greater than the top half inlet area.

10. The aircraft of claim 1, wherein the bottom section of the nacelle further comprises the body portion extending from the forward lip to an aft edge, wherein the body section defines a camber line, and wherein a length of the camber line of the forward lip is at least about five percent of the length of the camber line of the body portion of the bottom section.

11. The aircraft of claim 1, wherein the bottom section of the nacelle further comprises the body portion extending from the forward lip to an aft edge, wherein the body section defines a camber line, and wherein a length of the camber line for the forward lip is at least about ten percent of the length of the camber line of the body portion of the bottom section.

12. The aircraft of claim 1, wherein the aircraft defines a vertical direction, and wherein the forward lip of the bottom section is oriented downwardly along the vertical direction.

13. A propulsion system for an aircraft, the aircraft comprising a fuselage defining an aft end, the propulsion system comprising:
an aft engine configured to be mounted to the aft end of the fuselage and defining a centerline, the aft engine further comprising a nacelle including a bottom section having a forward lip, the forward lip defining a camber line and the camber line defining an angle relative to the centerline of the aft engine greater than or equal to at least about five degrees;
wherein the nacelle of the aft engine further includes a body portion, wherein the nacelle of the aft engine defines an outer surface, wherein the outer surface of the nacelle includes a concave shape between the forward lip of bottom section and the body portion.

14. The propulsion system of claim 13, wherein the camber line of the forward lip defines an angle relative to the centerline of the aft engine greater than or equal to at least about ten degrees.

15. The propulsion system of claim 13, wherein the nacelle of the aft engine further includes the body portion, wherein the nacelle of the aft engine defines an outer surface, wherein the outer surface of the nacelle includes a concave shape between the forward lip of bottom section and the body portion.

16. The propulsion system of claim 13, wherein the nacelle further comprises a top section, wherein the bottom section of the nacelle defines a forward edge at the forward lip, wherein the top section of the nacelle defines a forward edge, wherein the forward edge of top section is positioned farther forward than a forward edge of the bottom section along the longitudinal direction and defines a reference line extending therebetween, and wherein the reference line defines an angle with the centerline of the aft engine less than about eighty-five degrees.

17. The propulsion system of claim 13, further comprising:
a gas turbine engine; and
an electric generator driven by the gas turbine engine, wherein the aft engine is an electric fan powered by the electric generator.

18. The propulsion system of claim 13, wherein the aft engine is a boundary layer ingestion fan.

19. The propulsion system of claim 13, wherein the bottom section of the nacelle further comprises the body portion extending from the forward lip to an aft edge, wherein the body section defines a camber line, and wherein a length of the camber line of the forward lip is at least about five percent of the length of the camber line of the body portion of the bottom section.

20. A propulsion system for an aircraft, the aircraft comprising a fuselage defining an aft end, the propulsion system comprising:
an aft engine configured to be mounted to the aft end of the fuselage and defining a centerline, the aft engine further comprising a nacelle including a bottom section having a forward lip, the forward lip defining a camber line and the camber line defining an angle relative to the centerline of the aft engine greater than or equal to at least about five degrees; and
one or more structural members extending between the nacelle and the fuselage, the one or more structural members comprising one or more inlet guide vanes, the one or more inlet guide vanes further comprising:
a body portion that is fixed relative to the nacelle; and
at least one tail flap, the at least one tail flap configured to rotate about a substantially radial axis.

21. A propulsion system for an aircraft, the aircraft comprising a fuselage defining an aft end, the propulsion system comprising:
an aft engine configured to be mounted to the aft end of the fuselage and defining a centerline, the aft engine further comprising a nacelle including a bottom section having a forward lip, the forward lip defining a camber line and the camber line defining an angle relative to the centerline of the aft engine greater than or equal to at least about five degrees;
wherein the nacelle further comprises a top section, wherein the bottom section of the nacelle defines a forward edge at the forward lip, wherein the top section of the nacelle defines a forward edge, wherein the forward edge of top section is positioned farther forward than a forward edge of the bottom section along the longitudinal direction and defines a reference line extending therebetween, and wherein the reference line defines an angle with the centerline of the aft engine less than about eighty-five degrees.

22. A propulsion system for an aircraft, the aircraft comprising a fuselage defining an aft end, the propulsion system comprising:
an aft engine configured to be mounted to the aft end of the fuselage and defining a centerline, the aft engine further comprising a nacelle including a bottom section having a forward lip, the forward lip defining a camber line and the camber line defining an angle relative to the centerline of the aft engine greater than or equal to at least about five degrees;
wherein the bottom section of the nacelle further comprises a body portion extending from the forward lip to an aft edge, wherein the body section defines a camber line, and wherein a length of the camber line of the forward lip is at least about five percent of the length of the camber line of the body portion of the bottom section.

\* \* \* \* \*